United States Patent
Ghosh et al.

(10) Patent No.: US 9,727,374 B2
(45) Date of Patent: Aug. 8, 2017

(54) TEMPORARY VIRTUAL MACHINE MIGRATION FOR IMPROVED SOFTWARE APPLICATION WARMUP

(71) Applicant: International Business Machines Corporation, Armonk, NY (US)

(72) Inventors: Rahul Ghosh, Morrisville, NC (US); Shouvik Mitra, Kolkata (IN); Aaron J. Quirk, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 14/692,282

(22) Filed: Apr. 21, 2015

(65) Prior Publication Data

US 2016/0314016 A1    Oct. 27, 2016

(51) Int. Cl.
| | |
|---|---|
| *G06F 9/455* | (2006.01) |
| *G06F 9/46* | (2006.01) |
| *G06F 15/16* | (2006.01) |
| *G06F 15/173* | (2006.01) |
| *G06F 9/48* | (2006.01) |

(52) U.S. Cl.
CPC ........ *G06F 9/4856* (2013.01); *G06F 9/45558* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 8,341,213 B2* | 12/2012 | Heim | G06F 9/4401 709/203 |
| 8,346,313 B2 | 1/2013 | Tu | |
| 8,424,001 B2 | 4/2013 | Burckart et al. | |
| 2013/0326174 A1 | 12/2013 | Tsirkin | |
| 2013/0339956 A1 | 12/2013 | Murase et al. | |
| 2016/0170787 A1* | 6/2016 | DeCusatis | G06F 9/45558 718/1 |

OTHER PUBLICATIONS

Goetz, "Java theory and practice: Dynamic compilation and performance measurement", IBM, JavaWorks, Dec. 21, 2004, .ibm.com/developerworks/library/j-jtp12214/>.

* cited by examiner

*Primary Examiner* — Bing Zhao
(74) *Attorney, Agent, or Firm* — Maeve Carpenter (57) ABSTRACT

In an approach to reducing the duration of a software warmup process, one or more computer processors determine whether utilizing live migration of one or more virtual machines from a first computer to a second computer will reduce the duration of a warmup process of a software application. In response to determining that utilizing live migration of one or more virtual machines from a first computer to a second computer will reduce the duration of the warmup process, the one or more computer processors identify at least one second computer. The one or more computer processors migrate the one or more virtual machines to the at least one second computer. The one or more computer processors perform the warmup process. In response to performing the warmup process, the one or more computer processors migrate the one or more virtual machines to the first computer.

20 Claims, 6 Drawing Sheets

TEMPORARY VIRTUAL MACHINE MIGRATION FOR IMPROVED SOFTWARE APPLICATION WARMUP

BACKGROUND OF THE INVENTION

The present invention relates generally to the field of computer systems, and more particularly to improving software warmup efficiency by reducing the duration of a software warmup process for virtual machines.

The use of virtualization is becoming widespread. Virtualization describes a software abstraction that separates a computer resource and its use from an underlying physical device. Generally, a virtual machine (VM) provides a software execution environment and may have a virtual processor, virtual system memory, virtual storage, and various virtual devices. Virtual machines have the ability to accomplish tasks independent of particular hardware implementations or configurations. System virtualization is implemented through some managing functionality, typically hypervisor technology. Hypervisors, also called virtual machine managers (VMMs), use a thin layer of code in software or firmware to achieve fine-grained, dynamic resource sharing. Because hypervisors provide the greatest level of flexibility in how virtual resources are defined and managed, they are generally the primary technology for system virtualization.

Virtual machines may be migrated between a source host computing platform ("the source host") and a destination host computing platform ("the destination host") connected over a network, which may be a local area network or a wide area network that may include the Internet. Migration permits a clean separation between hardware and software, thereby improving facilities fault management, load balancing, and low-level system maintenance. Live migration permits an administrator to move a running virtual machine between different physical machines without disconnecting a running client or application program. For a successful live migration, memory, storage, and network connectivity of the virtual machine needs to be migrated from the source host to the destination host.

SUMMARY

Embodiments of the present invention disclose a method, a computer program product, and a system for reducing the duration of a software warmup process. The method may include one or more computer processors determining whether utilizing live migration of one or more virtual machines from a first computer to a second computer will reduce the duration of a warmup process of a software application. In response to determining that utilizing live migration of one or more virtual machines from a first computer to a second computer will reduce the duration of the warmup process, the one or more computer processors identify at least one second computer. The one or more computer processors migrate the one or more virtual machines to the at least one second computer. The one or more computer processors perform the warmup process. In response to performing the warmup process, the one or more computer processors migrate the one or more virtual machines to the first computer.

DETAILED DESCRIPTION

Warming up software, or segments of software, is a first step to improve runtime performance. In the context of a Java Virtual Machine® (JVM), warmup corresponds to repeated analysis of specific spots in a program followed by optimization for runtime. Additionally, middleware, user level cache entries, buffer pools, etc. are initialized and populated during a warmup phase as data propagates through a newly created instance. In a cloud-based system, many virtual machines (VMs) share the same physical machine. Warming up all VMs in parallel causes interference among the VMs due to the shared nature of underlying resources. For example, a software application may have a resident set size (RSS) in an address space of 1 GB at steady state (after warmup). However, during a warmup period, the RSS expands to 1.5 GB temporarily while the application aggressively attempts to analyze code for just-in-time (JIT) compilation, create new object pools, and populate caches. While the physical machine supports consolidation of many software applications of 1 GB steady state size, the same number of applications in warmup state may result in over allocation of physical memory. When the physical memory is over allocated, the performance of the entire system suffers and proper warmup is not achieved. On the other hand, warming up one VM at a time takes a fairly long time.

Embodiments of the present invention recognize that efficiency can be gained by temporarily migrating one or more VMs to a different physical machine during a software warmup phase in order to better utilize system resources and thereby reduce time required to perform the warmup process. Implementation of embodiments of the invention may take a variety of forms, and exemplary implementation details are discussed subsequently with reference to the Figures.

Figure 1:
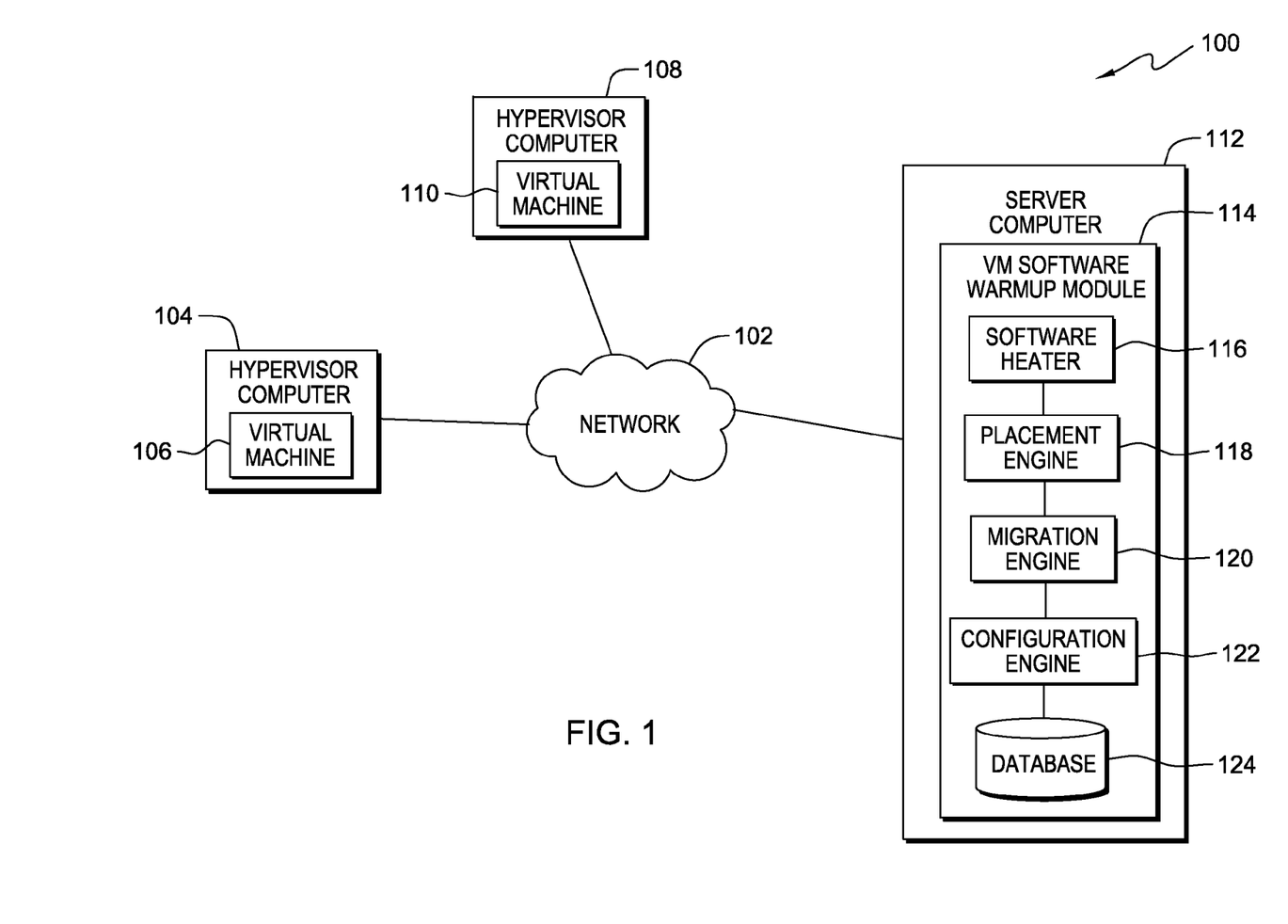
FIG. 1 is a functional block diagram illustrating a virtualized computing environment, in accordance with an embodiment of the present invention.

FIG. 1 is a functional block diagram illustrating a virtualized computing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Virtualized computing environment 100 includes hypervisor computer 104, hypervisor computer 108, and server computer 112, all interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between hypervisor computer 104, hypervisor computer 108, server computer 112, and other computing devices (not shown) within virtualized computing environment 100.

Hypervisor computer 104 and hypervisor computer 108 can each be a standalone computing device, a management server, a web server, a mobile computing device, or any other electronic device or computing system capable of receiving, sending, and processing data. In other embodiments, hypervisor computer 104 and hypervisor computer 108 can each represent a server computing system utilizing multiple computers as a server system, such as in a cloud computing environment ("the cloud"). In another embodiment, hypervisor computer 104 and hypervisor computer 108 can each be a laptop computer, a tablet computer, a netbook computer, a personal computer (PC), a desktop computer, a personal digital assistant (PDA), a smart phone, or any programmable electronic device capable of communicating with server computer 112 and other computing devices (not shown) within virtualized computing environment 100 via network 102. In another embodiment, hypervisor computer 104 and hypervisor computer 108 each represent a computing system utilizing clustered computers and components (e.g., database server computers, application server computers, etc.) that act as a single pool of seamless resources when accessed within virtualized computing environment 100. In some embodiments, hypervisor computer 104 and hypervisor computer 108 can each represent a plurality of hypervisors within virtualized computing environment 100. Hypervisor computer 104 includes virtual machine (VM) 106. Hypervisor computer 108 includes VM 110.

In exemplary embodiments, VM 106 represents one or more virtual machines partitioned from hypervisor computer 104, and VM 110 represents one or more virtual machines partitioned from hypervisor computer 108. VM 106 and VM 110 are each a software implemented abstraction of hardware of hypervisor computer 104 and hypervisor computer 108, respectively. VM 106 and VM 110 can each be utilized to emulate functions of a physical computer (e.g., execute programs). In one embodiment, resources of hypervisor computer 104 (e.g., memory, central processing units (CPUs), storage devices, and I/O devices (not shown)) can be partitioned into one or more virtual machines in VM 106. In one embodiment, resources of hypervisor computer 108 (e.g., memory, central processing units (CPUs), storage devices, and I/O devices (not shown)) can be partitioned into one or more virtual machines in VM 110.

Server computer 112 can be a standalone computing device, a management server, a web server, a mobile computing device, or any other electronic device or computing system capable of receiving, sending, and processing data. In other embodiments, server computer 112 can represent a server computing system utilizing multiple computers as a server system, such as in a cloud computing environment. In another embodiment, server computer 112 can be a laptop computer, a tablet computer, a netbook computer, a personal computer (PC), a desktop computer, a personal digital assistant (PDA), a smart phone, or any programmable electronic device capable of communicating with hypervisor computer 104, hypervisor computer 108, and other computing devices, such as a client computing device, (not shown) within virtualized computing environment 100 via network 102. In another embodiment, server computer 112 represents a computing system utilizing clustered computers and components (e.g., database server computers, application server computers, etc.) that act as a single pool of seamless resources when accessed within distributed data processing environment 100. Server computer 112 includes VM software warmup module 114.

VM software warmup module 114 temporarily distributes one or more application VMs to one or more additional physical machines to enable optimal resource utilization during a warmup phase. VM software warmup module 114 speeds up the warmup process and thereby improves the efficiency of the warmup process. After sufficient warmup is achieved, VM software warmup module 114 may reconsolidate the one or more VMs onto the original shared hardware. The desired warmup state is preserved because VM software warmup module 114 seamlessly transfers the process address space and shared backing resources, such as disks, between physical machines. In one embodiment, VM software warmup module 114 is a standalone software entity that performs VM software warmup. In another embodiment, VM software warmup module 114 includes a plurality of discreet components that each contribute to performing VM software warmup. The components may include: software heater 116, placement engine 118, migration engine 120, configuration engine 122, and database 124. VM software warmup module 114 is depicted and described in further detail with respect to FIG. 3.

In an embodiment where VM software warmup module 114 includes a plurality of discreet components, software heater 116 is a workload driven against a software application requiring warmup to stress the application such that the application runs efficiently during runtime. For example, software heater 116 may be similar or specific to a user's target workload, and designed to warm up a software application in a similar way to an actual workload. In another example, software heater 116 may be a subset of a user's actual workload, such that, for example, real-world work is mirrored to one or more newly provisioned VMs. In a further example, software heater 116 may be a generic, multi-purpose benchmark application. In yet another example, software heater 116 may be a transaction driver.

In an embodiment where VM software warmup module 114 includes a plurality of discreet components, placement engine 118 acts as a decision engine that determines to which physical machine a given VM should be migrated. In addition, migration engine 120 controls the movement of one or more VMs across a plurality of physical machines in the cloud. Also, configuration engine 122 temporarily modifies (e.g., increases) key resources of a migrating VM and restores the key resources prior to the return of the VM to the physical machine from which the VM originated. Additionally, VM software warmup module 114 utilizes database 124 to track resources allocated to the migrating VMs on each physical machine. Database 124 can be implemented with any type of storage device capable of storing data and configuration files that can be accessed and utilized by server computer 112, such as a database server, a hard disk drive, or a flash memory. In other embodiments, database 124 can represent multiple storage devices within server computer 112.

In one embodiment, virtualized computing environment 100 includes a client computing device (not shown). The client computing device may be the source of the workload that requires warmup. In the embodiment, VM software warmup module 114 instructs the client to perform the warmup process via an application programming interface (API).

Figure 2:
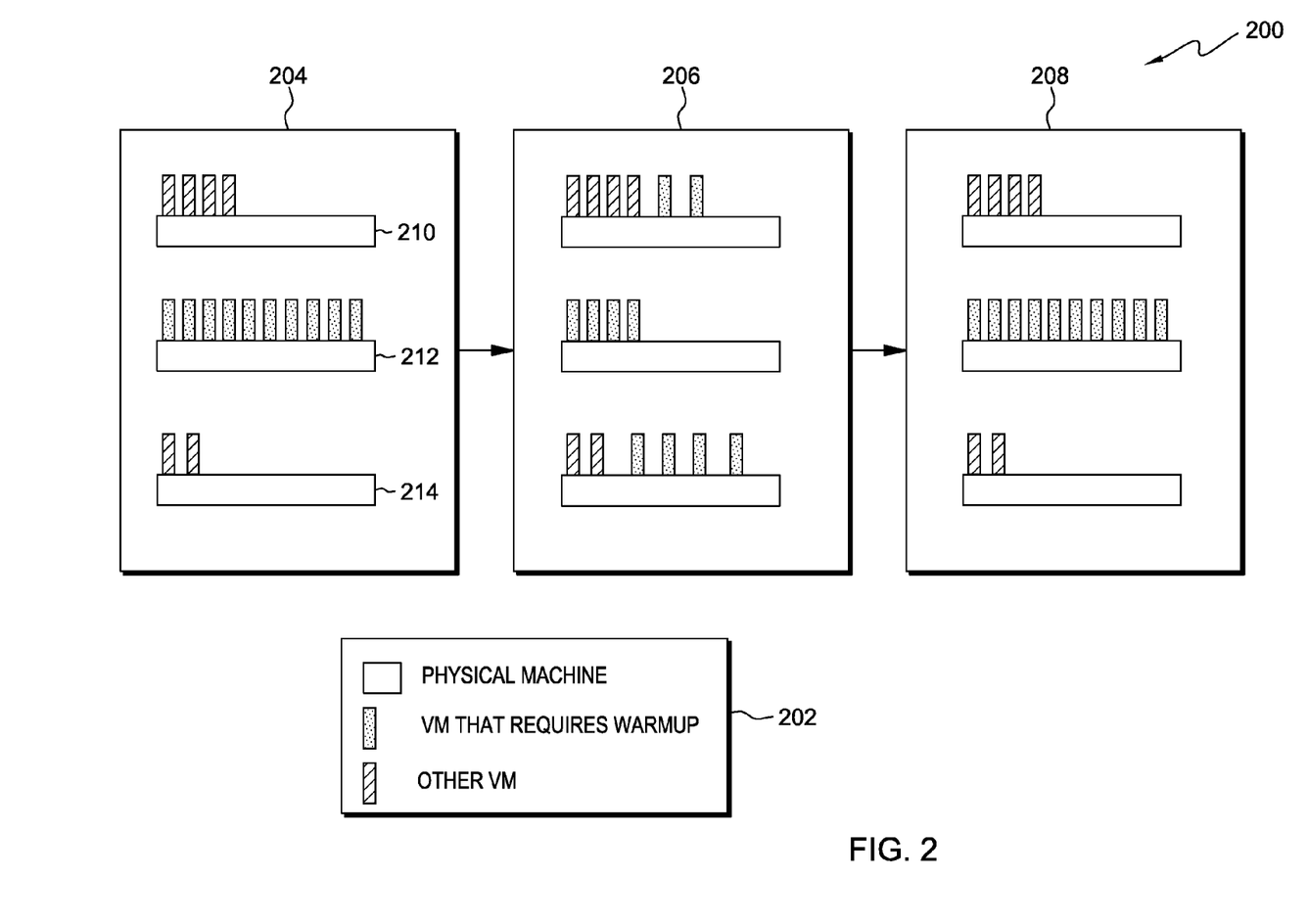
FIG. 2 is a flow diagram depicting a virtual machine software warmup process, on a plurality of server computers within the virtualized computing environment of FIG. 1, in accordance with an embodiment of the present invention.

FIG. 2 is a flow diagram depicting a virtual machine software warmup process, on a plurality of server computers within virtualized computing environment 100 of FIG. 1, in accordance with an embodiment of the present invention.

Flow diagram 200 includes key 202. Key 202 indicates that within flow diagram 200, an empty box represents a physical machine, such as, for example, hypervisor computer 104 or hypervisor computer 108, as depicted with respect to FIG. 1. Key 202 also indicates that within flow diagram 200, a box with a dot pattern represents a VM that needs to be warmed up. In addition, key 202 indicates that a cross-hatched box represents other VMs within virtualized computing environment 100.

Flow diagram 200 begins with box 204 which represents a virtualized computing environment, such as virtualized computing environment 100, which includes three physical machines. While physical machines 210 and 214 are lightly populated with VMs, physical machine 212 is over-committed with VMs that require warmup. If all VMs on physical machine 212 are warmed up simultaneously, performance degradation is likely. As depicted in box 206, VM software warmup module 114 utilizes live migration to temporarily move two VMs that require warmup to physical machine 210 and four VMs that require warmup to physical machine 214. Four VMs remain on the original physical machine, i.e., physical machine 212. The distribution of the VMs to the various physical machines enables efficient warmup of all ten VMs. As depicted in box 208, after warmup is complete, VM software warmup module 114 migrates the six VMs that were moved for software warmup back to physical machine 212.

Figure 3:
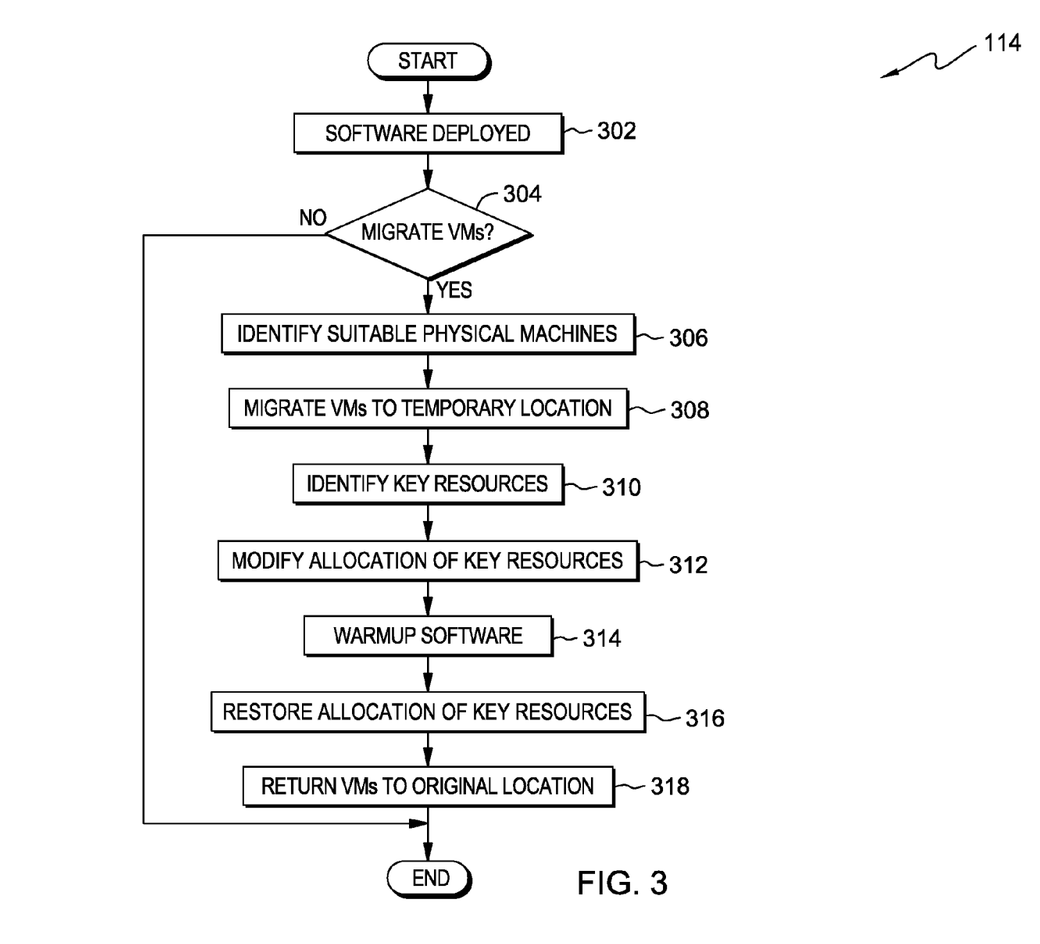
FIG. 3 is a flowchart depicting operational steps of a virtual machine software warmup module, on a server computer within the virtualized computing environment of FIG. 1, for reducing the duration of a software warmup process, in accordance with an embodiment of the present invention.

FIG. 3 is a flowchart depicting operational steps of virtual machine (VM) software warmup module 114, on server computer 112 within virtualized computing environment 100 of FIG. 1, for reducing the duration of a software warmup process, in accordance with an embodiment of the present invention.

VM software warmup module 114 determines that software is deployed (step 302). In one embodiment, a system administrator deploys one or more new VMs or one or more new software applications that require warmup, and VM software warmup module 114 determines that software is deployed. In another embodiment, the system administrator supplies an indication to VM software warmup module 114 that one or more new VMs or one or more new software applications that require warmup. In a further embodiment, software heater 116, upon generating a load, sends a request to placement engine 118 to warm up new software. Examples of software that may be deployed include, but are not limited to, Java Virtual Machines®, virtual machines (VMs), logical partitions (LPARs), workload partitions (WPARs), database managers (DBMs), and middleware.

VM software warmup module 114 determines whether to migrate VMs for warmup (decision block 304). VM software warmup module 114 determines whether migration of one or more VMs may be beneficial, i.e., reduce warmup process duration, by assessing the available resources on the original physical machine for performing a software warmup. In one embodiment, placement engine 118 checks records in database 124 and decides whether one or more VMs may benefit from temporary migration. For example, a VM may benefit from a temporary migration to a different physical machine if the resources of the physical machine on which the VM resides may become over allocated during the warmup process and thereby cause the warmup process to be slow or inaccurate. If VM software warmup module 114 determines that VM migration is not beneficial ("no" branch, decision block 304), then VM software warmup module 114 completes execution and ends.

If VM software warmup module 114 determines that VM migration is beneficial ("yes" branch, decision block 304), then VM software warmup module 114 identifies one or more suitable physical machines (step 306). In one embodiment, placement engine 118 identifies which one or more physical machines in the cloud are suitable for VM migration. For example, placement engine 118 may determine which physical machines are suitable by determining which physical machines have sufficient memory to temporarily accommodate one or more additional VMs. In another example, placement engine 118 may determine which physical machines are suitable by determining which physical machines are not highly utilized. In a further example, placement engine 118 may determine which physical machines are suitable by determining which physical machines have a significant amount of a particular compute resource that the application or workload needs.

Responsive to identifying one or more suitable physical machines, VM software warmup module 114 migrates VMs to a temporary location (step 308). VM software warmup module 114 uses live migration techniques, as would be apparent to those of ordinary skill in the art, to migrate one or more VMs to one or more physical machines in the cloud. In one embodiment, migration engine 120 moves the one or more VMs to a temporary location.

VM software warmup module 114 identifies key resources (step 310). VM software warmup module 114 determines the key resources of a VM, i.e., constraints, for the particular software application or workload that is being warmed up. Key resources include, but are not limited to, virtual CPU cores, memory, network bandwidth, and storage media. In one embodiment, configuration engine 122 identifies the key resources. In one embodiment, key resources are defined in database 124. In another embodiment, key resources may be identified via behavior of previous warmup cycles for a similar application or workload.

VM software warmup module 114 modifies allocation of key resources (step 312). VM software warmup module 114 dynamically modifies the allocation or properties of key resources. VM software warmup module 114 determines which of the key resources of the one or more migrated VMs to modify based on requirements, or criteria, of an application or workload that requires warmup. For example, VM software warmup module 114 may determine that an increase in the number of virtual CPU cores may be beneficial to a warmup process. In another example, VM software warmup module 114 may determine that an increase in memory capacity or reservation may be beneficial to a warmup process. In one embodiment, configuration engine 122 modifies the allocation of key resources. In another embodiment, VM software warmup module 114 may determine that current key resources of the one or more VMs are adequate to accommodate a warmup, and does not modify key resources.

VM software warmup module 114 warms up software (step 314). VM software warmup module 114 performs software warmup utilizing techniques known in the art. In one embodiment, software heater 116 performs the software warmup. VM software warmup module 114 monitors the software performance and continues the warmup process until the application or workload is sufficiently warm. For example, VM software warmup module 114 may determine an application or workload is sufficiently warm by detecting a steady state performance is achieved. In another example, VM software warmup module 114 may determine an application or workload is sufficiently warm by detecting a target performance threshold associated with, for example, specific throughput or latency, is achieved. In a further example, VM software warmup module 114 may determine an application or workload is sufficiently warm by determining a cache memory is loaded. In one embodiment, states or thresholds that indicate an end to a warmup phase are defined and stored in database 124.

VM software warmup module 114 restores allocation of key resources (step 316). If VM software warmup module 114 modified allocation of key resources in step 312, then VM software warmup module 114 restores the original configuration and properties of the resources once warmup is complete. In one embodiment, configuration engine 122 restores the allocation of key resources.

VM software warmup module 114 returns VMs to original location (step 318). Once warmup is complete and any modified resources are restored to the original allocation, VM software warmup module 114 migrates the one or more VMs that were moved in step 308 back to the physical machine from which the VMs originated. In one embodiment, migration engine 120 returns the migrated VMs to the source physical machine.

Figure 4:
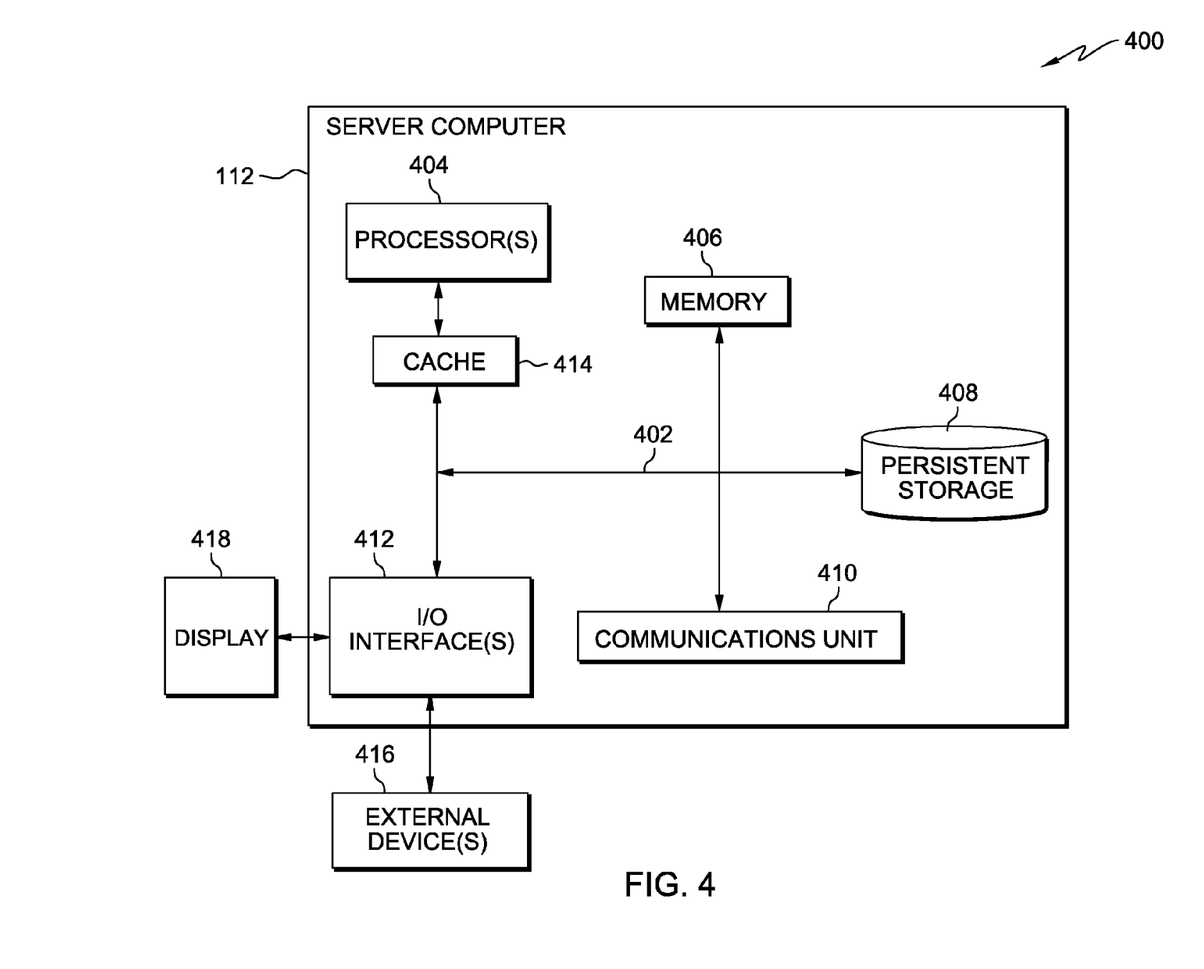
FIG. 4 depicts a cloud computing node, according to an embodiment of the present invention.

Referring now to FIG. 4, a schematic of an example of a cloud computing node is shown. Cloud computing node 400 is only one example of a suitable cloud computing node and is not intended to suggest any limitation as to the scope of use or functionality of embodiments of the invention described herein. Regardless, cloud computing node 400 is capable of being implemented and/or performing any of the functionality set forth hereinabove.

In cloud computing node 400 there is a server computer 112, which is operational with numerous other general purpose or special purpose computing system environments or configurations. Examples of well-known computing systems, environments, and/or configurations that may be suitable for use with server computer 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Server computer 112 may be described in the general context of computer system executable instructions, such as program modules, being executed by a computer system. Generally, program modules may include routines, programs, objects, components, logic, data structures, and so on that perform particular tasks or implement particular abstract data types. Server computer 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, server computer 112 in cloud computing node 400 is shown in the form of a general-purpose computing device. Server computer 112 includes processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention are stored in persistent storage 408 for execution and/or access by one or more of the respective processor(s) 404 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of hypervisor computer 104, hypervisor computer 108, and server computer 112. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to cloud computing node 400. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media, for example, devices such as thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touchscreen, such as a display of a tablet computer.

Figure 5:
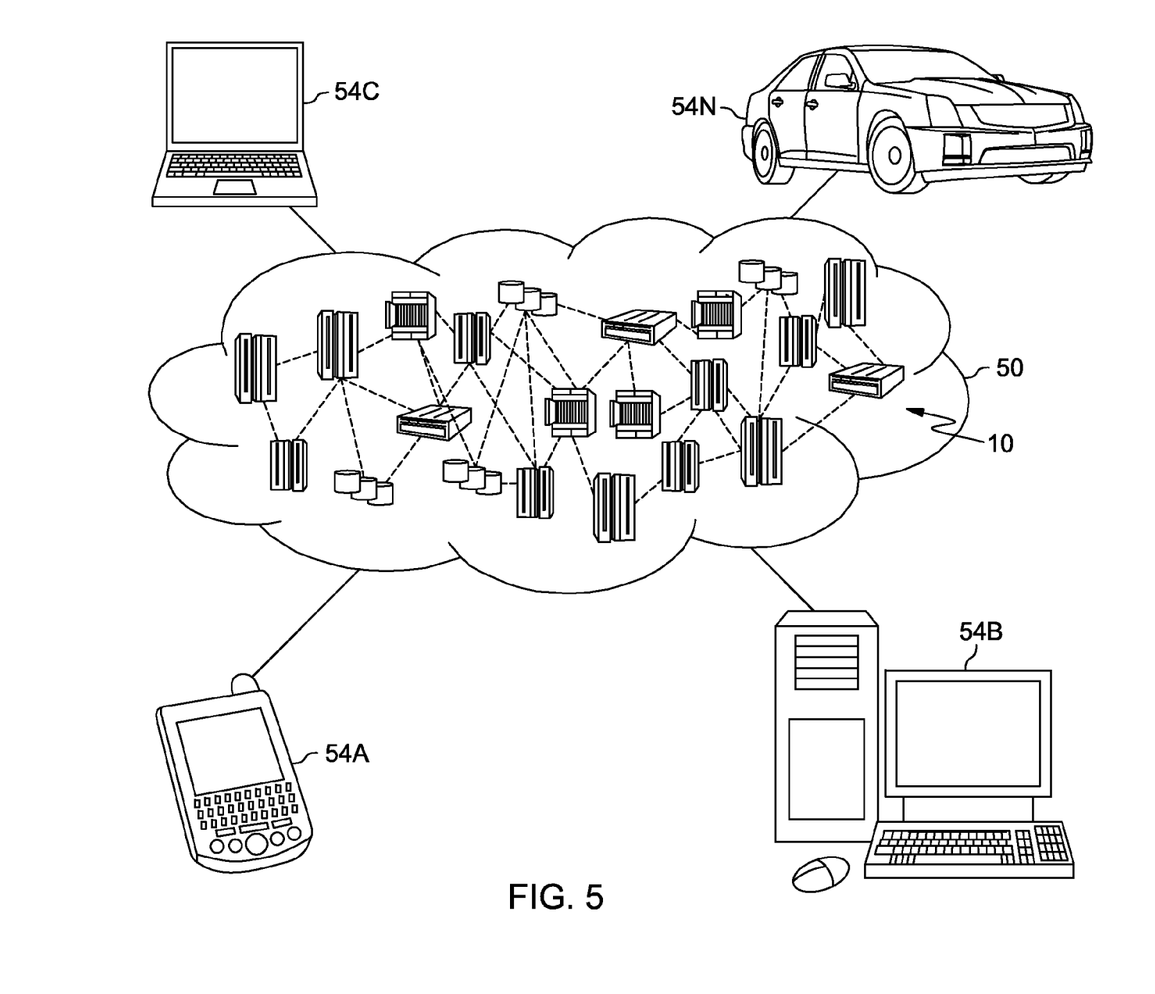
FIG. 5 depicts a cloud computing environment, according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
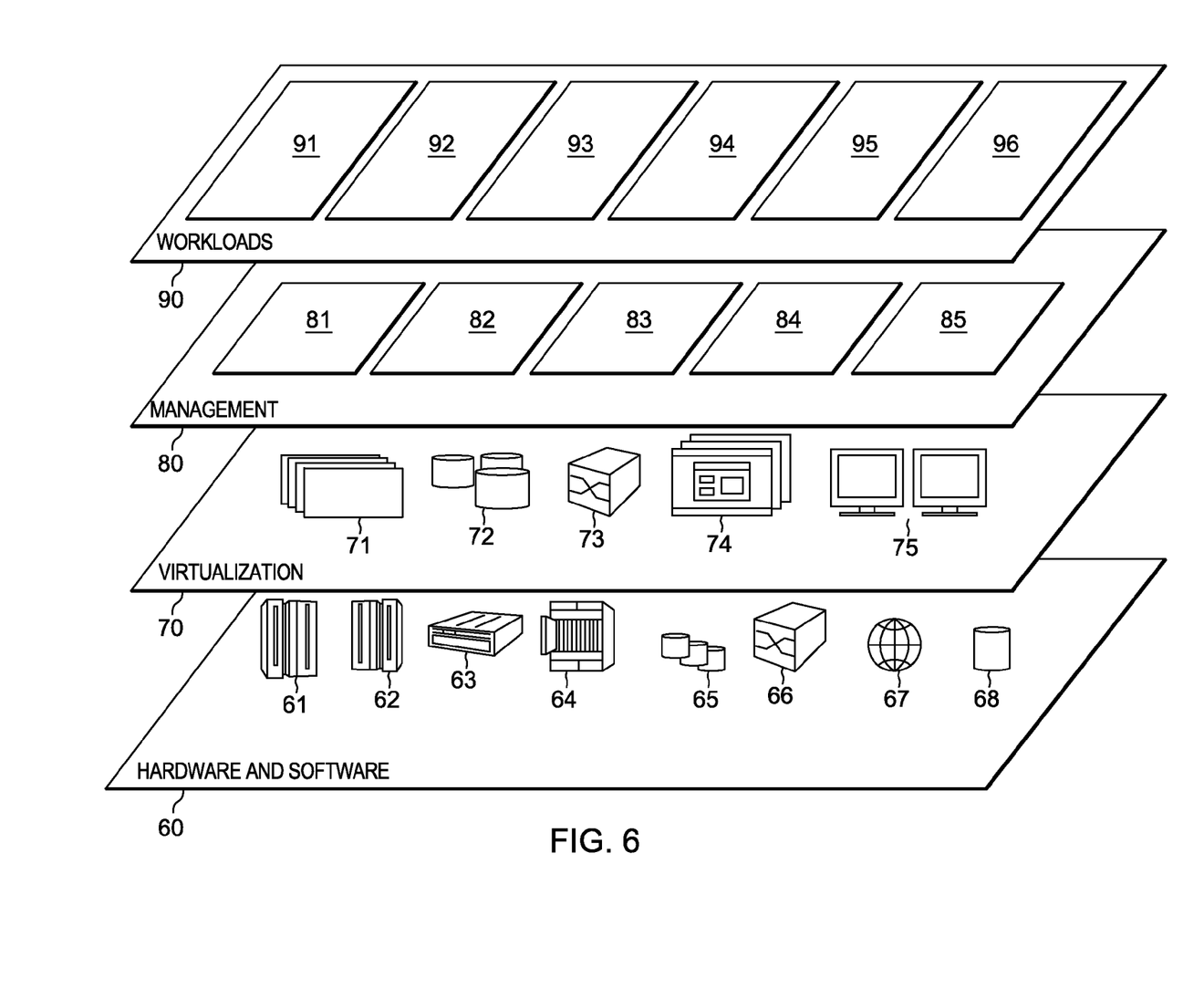
FIG. 6 depicts abstraction model layers, according to an embodiment of the present invention.

Referring now to FIG. 6, a set of functional abstraction layers provided by cloud computing environment 50 (FIG. 5) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and VM software warmup module 96.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for reducing a duration of a software application warmup process on a virtual machine, the method comprising:
    determining, by one or more computer processors, whether utilizing live migration of one or more virtual machines from a first computer to a second computer will reduce a duration of a warmup process of a software application of the one or more virtual machines, wherein the warmup process corresponds to one or more analyses of the software application followed by optimization of the software application for runtime execution;
    responsive to determining that utilizing live migration of one or more virtual machines from a first computer to a second computer will reduce the duration of the warmup process, identifying, by the one or more computer processors the second computer, wherein the second computer is suitable for live virtual machine migration;
    migrating, by the one or more computer processors, the one or more virtual machines from the first computer to the second computer;
    performing, by the one or more computer processors, the warmup process of the software application on the second computer; and
    responsive to completion of the warmup process, migrating, by the one or more computer processors, the one or more virtual machines from the second computer to the first computer.

2. The method of claim 1, further comprising:
    responsive to migrating the one or more virtual machines to the second computer, identifying, by the one or more computer processors, one or more resources of the one or more virtual machines;
    modifying, by the one or more computer processors, an allocation of at least one of the one or more resources of the one or more virtual machines, based, at least in part, on warmup process criteria; and
    responsive to performing the warmup process, restoring, by the one or more computer processors, the modified allocation of the at least one of the one or more resources to an original allocation.

3. The method of claim 2, wherein resource allocation is selected from a group including at least one of: one or more virtual CPU cores, a memory, a network bandwidth, and a storage media.

4. The method of claim 2, wherein modifying the allocation of at least one of the one or more resources further comprises increasing, by the one or more computer processors, the allocation of the at least one of the one or more resources.

5. The method of claim 1, further comprising, prior to determining whether utilizing live migration of one or more virtual machines from the first computer to the second computer will reduce the duration of the warmup process of the software application, receiving, by the one or more computer processors, an indication that the software application is deployed.

6. The method of claim 1, wherein the software application includes at least one of: a Java Virtual Machine ®, a virtual machine, a logical partition, a workload partition, a database manager, and a middleware.

7. The method of claim 1, wherein performing the warmup process further comprises processing, by the one or more computer processors, a computer workload, wherein the computer workload includes at least one of: a user's workload, a benchmark workload, and a transaction driver.

8. A computer program product for reducing a duration of a software warmup process, the computer program product comprising:
    one or more computer readable storage media and program instructions stored on the one or more computer readable storage media, wherein the one or more computer readable storage media are hardware, the program instructions comprising:
    program instructions to determine whether utilizing live migration of one or more virtual machines from a first computer to a second computer will reduce a duration of a software application warmup process of the one or more virtual machines, wherein the warmup process corresponds to one or more analyses of the software application followed by optimization of the software application for runtime execution;

responsive to determining that utilizing live migration of one or more virtual machines from a first computer to a second computer will reduce the duration of the warmup process, program instructions to identify the second computer, wherein the second computer is suitable for live virtual machine migration;

program instructions to migrate the one or more virtual machines from the first computer to the second computer;

program instructions to perform the warmup process of the software application on the second computer; and responsive to completion of the warmup process, program instructions to migrate the one or more virtual machines from the second computer to the first computer.

9. The computer program product of claim 8, further comprising:

responsive to migrating the one or more virtual machines to the second computer, program instructions to identify one or more resources of the one or more virtual machines;

program instructions to modify an allocation of at least one of the one or more resources of the one or more virtual machines, based, at least in part, on warmup process criteria; and responsive to performing the warmup process, program instructions to restore the modified allocation of the at least one of the one or more resources to an original allocation.

10. The computer program product of claim 9, wherein resource allocation is selected from a group including at least one of: one or more virtual CPU cores, a memory, a network bandwidth, and a storage media.

11. The computer program product of claim 9, wherein modifying the allocation of at least one of the one or more resources further comprises increasing, by the one or more computer processors, the allocation of the at least one of the one or more resources.

12. The computer program product of claim 8, further comprising, prior to determining whether utilizing live migration of one or more virtual machines from the first computer to the second computer will reduce the duration of the warmup process of the software application, program instructions to receive an indication that the software application is deployed.

13. The computer program product of claim 8, wherein the software application includes at least one of: a Java Virtual Machine ®, a virtual machine, a logical partition, a workload partition, a database manager, and a middleware.

14. The computer program product of claim 8, wherein performing the warmup process further comprises processing, by the one or more computer processors, a computer workload, wherein the computer workload includes at least one of: a user's workload, a benchmark workload, and a transaction driver.

15. A computer system for reducing a duration of a software warmup process, the computer system comprising:
one or more computer processors;
one or more computer readable storage device;
program instructions stored on the one or more computer readable storage device for execution by at least one of the one or more computer processors, the program instructions comprising:

program instructions to determine whether utilizing live migration of one or more virtual machines from a first computer to a second computer will reduce a duration of a software application warmup process of the one or more virtual machines, wherein the warmup process corresponds to one or more analyses of the software application followed by optimization of the software application for runtime execution;

responsive to determining that utilizing live migration of one or more virtual machines from a first computer to a second computer will reduce the duration of the warmup process, program instructions to identify the second computer, wherein the second computer is suitable for live virtual machine migration;

program instructions to migrate the one or more virtual machines from the first computer to the second computer;

program instructions to perform the warmup process of the software application on the second computer; and responsive to completion of the warmup process, program instructions to migrate the one or more virtual machines from the second computer to the first computer.

16. The computer system of claim 15, further comprising:

responsive to migrating the one or more virtual machines to the second computer, program instructions to identify one or more resources of the one or more virtual machines;

program instructions to modify an allocation of at least one of the one or more resources of the one or more virtual machines, based, at least in part, on warmup process criteria; and responsive to performing the warmup process, program instructions to restore the modified allocation of the at least one of the one or more resources to an original allocation.

17. The computer system of claim 16, wherein resource allocation is selected from a group including at least one of: one or more virtual CPU cores, a memory, a network bandwidth, and a storage media.

18. The computer system of claim 16, wherein modifying the allocation of at least one of the one or more resources further comprises increasing, by the one or more computer processors, the allocation of the at least one of the one or more resources.

19. The computer system of claim 15, further comprising, prior to determining whether utilizing live migration of one or more virtual machines from the first computer to the second computer will reduce the duration of the warmup process of the software application, program instructions to receive an indication that the software application is deployed.

20. The computer system of claim 15, wherein performing the warmup process further comprises processing, by the one or more computer processors, a computer workload, wherein the computer workload includes at least one of: a user's workload, a benchmark workload, and a transaction driver.

* * * * *